UNITED STATES PATENT OFFICE 2,345,121

METHOD FOR THE MANUFACTURE OF CONDENSATION PRODUCTS

Winfrid Hentrich, Rodleben, near Dessau-Rosslau, Anhalt, and Alfred Kirstahler, Dessau, Anhalt, Germany; vested in the Alien Property Custodian No Drawing. Application November 21, 1939, Serial No. 305,458. In Germany November 23, 1938

1 Claim. (Cl. 260—556)

The present invention relates to alkylene oxide derivatives of diacyl imides wherein the acyl radicals are carbonyl or sulfonyl groups and to their reaction products with organic or inorganic polybasic acids.

It is the purpose of this invention to provide industry with a group of commercially significant compounds adapted for direct use and for commercial synthesis. The compounds of the instant invention are especially useful as softening and plasticizing agents for both natural and synthetic resins, such as those derived from cellulose, vinyl compounds, natural and synthetic caoutchouc and the like. Certain of the compounds also have capillary-active properties and therefore are valuable as soap-substitutes in wetting, emulsifying, dispersing, washing and deterging operations.

It has been found that valuable condensation-products of the general formula R.X.N(G)Y.R' are obtainable in condensing—in a way known in itself—acid-halogenides of the general formula R'.Y.Hal with acid-amides of the general formula R.X.NH₂ or their metal-compounds respectively and in converting the thus obtained condensation-products with alkylene-oxides. In the said formulae R and R' means any homogeneous or unhomogeneous organic residues, X and Y the groups $SO_2$ and CO; Hal a halogen atom and G a residue formed by an addition of alkylene oxides.

The organic residues R and R' of the general formula may belong to the aliphatic, cycloaliphatic, aromatic or heterocyclic series or mixed types of these series; they may eventually contain hetero-atoms or hetero-atom groups such as halogen, oxygen, sulfur, nitrogen, hydroxyl-keto-, ester-, sulfo-, amino-, alkylamino-, acylamino-, sulfimide-, inorganic and organic acid groups and the like.

Those residues may be e. g. methyl-, ethyl-, butyl-, hexyl-, octyl-, dodecyl-, oleyl-, ricinoleyl-, montanyl residues and the like, furthermore any ramified residues such as isohexyl-, isododecyl-, iso-octadecyl residues and the like.

As cyclic hydrocarbon residues there may be considered the cyclo-hexyl residue, cyclohexyl residues substituted in the nucleus by any alkyl residues, the naphthenyl-, abietyl-, benzyl-, tetrahydro-menaphthyl residue, phenyl-, naphthyl-, anthrazyl residues, phenyl- or naphthyl residues substituted in the nucleus by any alkyl- or cyclo-alkyl residues, pyridine- and quinoline-residues and the like.

As initial stuffs for the present method we may consequently apply e. g. the halogenides or amides of the following sulfonic acids: octyl-sulfonic acid, dodecyl-sulfonic acid, cetyl-sulfonic acid, octadecyl-sulfonic acid, p-dodecylamino-benzol-sulfonic acid, p-octadecyl-hydroxy-benzol-sulfonic acid, alkylated naphthaline- and tetrahydronaphthaline-sulfonic acids, furthermore methyl-sulfonic acid, n-butyl-sulfonic acid, propan-1,3-disulfonic acid, cyclohexyl-sulfonic acid, benzyl-sulfonic acid, toluol-4-sulfonic acid, chlorobenzol-4-sulfonic acid, benzol-1,3-disulfonic acid, naphthaline-1-monosulfonic acid, -1,5-disulfonic acid or -1,3,6-trisulfonic acid respectively, dimethyl-aniline-p-sulfonic acid and the like.

In a corresponding manner we may apply the halogenides and amides of the following carbonic acids: acetic acid, butyric acid, lauric acid, oleic acid, montan acid, adipic acid, naphthenic acid, abietic acid or other resinic acids, benzoic acid, phthalic acid, cyclohexane-di-acetic acid, pyridine-carbonic acids and the like.

The converting among the initial stuffs is performed according to methods known in themselves either directly or in the presence of an indifferent diluent such as benzine, chlorohydrocarbons, benzol and the like, whereby sulfimides as well as carbimides or also mixed acidimides may be developed. The acid-amides are preferably applied in the form of their metal- and particularly of their alkali-metal compounds. But we may likewise work with the free acid-amides and eventually in the presence of acid-binding agents. Instead of the acid-halogenides we may also use any other functional derivatives of those acids such as acid-anhydrides.

Condensation-products obtained in this way are e. g. the methyl-n-dodecyl-sulfimide, di-octyl-sulfimide, p-toluol-dodecyl-sulfimide, m-carboxyphenyl-dodecyl-sulfimide, hexadecyl-benzyl-sulfimide, octadecyl-cyclohexyl-sulfiamide, p-dodecyl-amino-benzol-methyl-sulfimide, bis-(n-octyl-sulfo)-1,3-phenylene-disulfo-di-imide of the formula

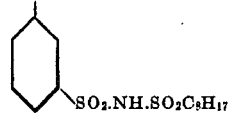

furthermore hexadecyl-octyl-sulfimide, octadecyl-cyclohexyl-sulfimide, tetradecyl-benzyl-sulfimide, di-p-toluol-sulfimide, 3,4-dichlorobenzol-benzyl-sulfimide, 3-nitro-benzol-4'-methyl-benzol-sulfimide, bis-(4', 3'-dichloro-benzol-sulfo-) 1,3-di-sulfo-benzol-di-imide of the formula

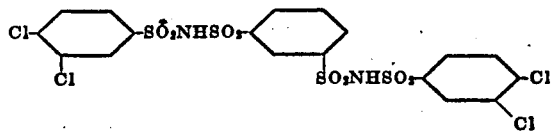

N-acetyl-, N-isobutyryl-, N-lauroyl-benzol-sulfamide, N-oleoyl-toluol-sulfamide, diacetamide, dipropionamide, dibenzamide, N-lauroyl-benzamide, N-acetyl-toluyl-amide and the like.

Those condensation-products corresponding to the present invention are now treated with alkylene-oxides. Such alkylene-oxides are e. g. ethylene-oxide, 1,2-propylene-oxide, 1,2-butylene oxide, 1,2-cetene-oxide, glycide, epi-chlorhydrine, cyclo-hexene-oxide, methyl-cyclo-hexene-oxide and the like. With this reaction condensation-products are developed with an oxalkyl-group or with poly-ether-groups respectively, which are then of a particular technical value in letting the alkylene-oxides react in excess upon the imides, because we thus are in a position of obtaining the solubility of the total molecule in water. If in this case the imides contain lipophile residues i. e. at least one higher molecular hydrocarbon residue of no less than 6 C atoms, we come to stuffs with capillary active properties, which are therefore of a particular technical value.

The reacting of the alkylene oxides may be performed in quantities of 1 to 25 mols and more. According to the size of the molecule of the imide we preferably apply quantities of 6 to 15 mols. The reaction may be enhanced especially by basic stuffs such as caustic alkalis and alcohols as well as by phenolates or we may likewise employ the salts—and especially alkali salts—of the imides themselves.

The products obtained according to the present method may serve as softening means and plastifying means for cellulose-derivatives, artificial stuffs e. g. of the poly-vinyl series, natural or artificial caoutchouc and the like. As far as the products are capillary active they show excellent wetting-out-, emulsifying-, dispersing-, washing- and deterging properties and they are therefore valuable soap-substitutes because of their real colloidal character. Owing to this quality they are advantageously used in the leather-, fur- and textile industries as well as in laundries.

The alcoholic hydroxy-groups developing in the converting with the alkylene-oxides may eventually be converted with reactive compounds e. g. while forming esters with poly-basic inorganic or organic acids or with their functional derivatives such as sulfuric acid, phosphoric acid, boric acid, sulfo-acetic acid, sulfo-succinic acid, sulfo-phthalic acid, halogen fatty acids, whereat a further improvement of the products may be obtained for certain applying-purposes and especially an enhancement of the solubility in water.

Example 1

11.4 weight-parts of methyl-sulfochloride and 35.5 weight-parts of octa-decyl-sulfamide-sodium are boiled at the reflux-cooler for several hours and in the presence of 120 weight parts of toluol. After distilling-off the solvent the residue is treated with a hot and very diluted soda-solution, whereupon we filter off from any unsolved particles. The thus formed condensation-product is then separated from the filtrate with mineral acids. There remains a fatty to wax-like substance of the formula $$CH_3.SO_2.NH.SO_2.C_{18}H_{37}$$

41 weight parts of this condensation-product are treated in the autoclave with 53 weight parts of ethylene-oxide while stirring at 120 to 130° C. and in the presence of 1% of caustic soda. The heating is continued till the pressure has practically ceased. The thus obtained condensation-product is a viscous water-soluble mass which supplies lathering aqueous solutions. In an analogous manner we obtain the reaction-product of ethylene-oxide on di-n-octyl-sulfoimide, which is likewise soluble in water.

Example 2

23.7 weight parts of lauric acid chloride and 19.5 weight parts of benzol-sulfamide-potassium are condensed as per Example 1 by boiling at the reflux-cooler in the presence of toluol. We thus obtain, after working-up, the condensation-product of the formula $$C_{12}H_{25}.CO.NH.SO_2.C_6H_5$$

in the form of a white mass. 35.3 weight parts of this product are treated as per Example 1 in the autoclave with 30 weight parts of ethyl-oxide. 39.7 weight parts of the thus obtained additive product of the formula $$C_{12}H_{25}.CO.N(C_2H_4.OH).SO_2.C_6H_5$$

are sulfonated with 12.5 weight parts of chlorosulfonic acid in the presence of 50 cm.$^3$ of ether at 5 to 15° C. Then we continue stirring for a little while at room temperature till a sample proves soluble in water, whereupon we neutralize with a 33%-sodium lye. The reaction-product is worked up in the usual way and in aqueous solutions it shows soap-like properties.

What we claim is:

A water-soluble capillary active compound, the condensation product of ethylene oxide with an imide of the formula $$CH_3.SO_2.NH(G)SO_2.C_{18}H_{37}$$

the condensation taking place in the approximate molar ratio of 1:12 and (G) is the residue derived from the 12 mols of ethylene oxide.

WINFRID HENTRICH.
ALFRED KIRSTAHLER.